United States Patent
Schwarzhans et al.

(10) Patent No.: US 11,236,784 B2
(45) Date of Patent: Feb. 1, 2022

(54) STEERING SHAFT FOR A MOTOR VEHICLE

(71) Applicants: THYSSENKRUPP PRESTA AG, Eschen (LI); thyssenkrupp AG, Essen (DE)

(72) Inventors: Paul Schwarzhans, Feldkirch (AT); René Marco Schmidt, Lienz (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 309 days.

(21) Appl. No.: 16/346,908

(22) PCT Filed: Nov. 15, 2017

(86) PCT No.: PCT/EP2017/079297
§ 371 (c)(1),
(2) Date: May 2, 2019

(87) PCT Pub. No.: WO2018/091516
PCT Pub. Date: May 24, 2018

(65) Prior Publication Data
US 2019/0316635 A1    Oct. 17, 2019

(30) Foreign Application Priority Data
Nov. 18, 2016    (DE) ...................... 10 2016 222 795.5

(51) Int. Cl.
*F16D 3/06* (2006.01)
*B62D 1/20* (2006.01)
*F16C 3/035* (2006.01)

(52) U.S. Cl.
CPC ............... *F16D 3/065* (2013.01); *B62D 1/20* (2013.01); *F16C 3/035* (2013.01)

(58) Field of Classification Search
CPC . F16D 3/065; B62D 1/20; F16C 3/035; F16C 39/02; F16C 29/04
(Continued)

(56) References Cited

U.S. PATENT DOCUMENTS 2,284,199 A * 5/1942 Greiner ................. F16D 3/2052
464/167
9,347,492 B2 * 5/2016 Simon ....................... F16D 3/84
(Continued)

FOREIGN PATENT DOCUMENTS

CN    1747867 A    3/2006
CN    101646592 A    2/2010
(Continued)

OTHER PUBLICATIONS

International Search Report issued in PCT/EP2017/079297 dated Feb. 7, 2018.

*Primary Examiner* — Greg Binda
(74) *Attorney, Agent, or Firm* — thyssenkrupp North America, LLC

(57) ABSTRACT

A steering shaft for a motor vehicle includes a hollow outer shaft with a longitudinal axis. An inner shaft is arranged coaxially within the outer shaft. The inner shaft telescopes longitudinally relative to the outer shaft and is connected in a torque-transmitting manner to the outer shaft via a rolling body. The rolling body can roll in the direction of the longitudinal axis and the rolling body bearing in a positively locking manner in the circumferential direction about the longitudinal axis between rolling body raceways on the inner and outer shaft. The steering shaft includes a securing element with a supporting body arranged between supporting faces configured on the inner shaft and on the outer shaft, which at least one supporting body can be supported in a positively locking manner in the circumferential direction.

(Continued)

The supporting body is spaced apart in the circumferential direction from the supporting faces.

11 Claims, 4 Drawing Sheets

(58) Field of Classification Search
USPC .................................... 464/167; 384/9, 54
See application file for complete search history.

(56) References Cited

U.S. PATENT DOCUMENTS

| 2006/0156855 | A1 | | 7/2006 | Kinji |
| 2009/0272220 | A1 | | 11/2009 | Christoph |
| 2020/0255050 | A1 | * | 8/2020 | Wyss ................. B62D 1/20 |

FOREIGN PATENT DOCUMENTS

| CN | 205589293 U | | 9/2016 |
| DE | 37 30 393 A | | 3/1989 |
| DE | 103 59 962 A | | 7/2005 |
| DE | 10 2014 017 555 A | | 6/2016 |
| EP | 1 790 868 A | | 5/2007 |
| EP | 3 037 322 A | | 6/2016 |
| EP | 3 045 378 A | | 7/2016 |
| JP | 2007/016901 A | | 1/2007 |
| JP | 2007-24122 A | * | 2/2007 |
| JP | 2007-024122 A | | 2/2007 |
| JP | 2007-255546 A | | 10/2007 |
| JP | 2010/053943 A | | 3/2010 |

* cited by examiner

STEERING SHAFT FOR A MOTOR VEHICLE

CROSS REFERENCE TO RELATED APPLICATIONS

This application is a U.S. National Stage Entry of International Patent Application Serial Number PCT/EP2017/079297, filed Nov. 15, 2017, which claims priority to German Patent Application No. DE 10 2016 222 795.5, filed Nov. 18, 2016, the entire contents of both of which are incorporated herein by reference.

FIELD

The present disclosure generally relates to a steering shaft for a motor vehicle.

BACKGROUND

Telescopic steering shafts in motor vehicles make an adjustment of the steering column possible, it being possible for the steering wheel position to be set longitudinally in the axial direction of the steering shaft. Moreover, the steering shaft can be pushed together in the case of a crash, as a result of which it is prevented effectively that the steering column penetrates further into the interior of the passenger compartment and leads to injuries of the occupants. This is achieved as a rule by way of the provision of two shafts which can be telescoped with respect to one another, namely an outer shaft which is configured as a hollow shaft in the form of a tubular hollow profile, and an inner shaft which is mounted therein such that it can be displaced in the direction of the longitudinal axis of the steering shaft. The inner shaft and the outer shaft together form the steering shaft which can be shortened or lengthened correspondingly by way of a telescoping relative movement.

In the case of steering shafts of the generic type which are also called rolling/sliding shafts, the rolling bodies, for example balls, serve to configure a low friction linear anti-friction bearing system which ensures a permanently smooth adjustment of the inner shaft in the outer shaft in the direction of the longitudinal axis in order to set the steering wheel position in the longitudinal direction. At the same time, the rolling bodies serve as positively locking elements for the transmission of the torque which is introduced for steering purposes from the inner shaft to the outer shaft. To this end, groove-like rolling body raceways which lie radially opposite one another and run in the longitudinal direction are configured in the inner shaft and the outer shaft, in which rolling body raceways the rolling bodies can roll only in the longitudinal direction. With regard to a rotation about the longitudinal axis, the rolling bodies engage in a positively locking manner into the rolling body raceways. As a result, a steering torque which is input into the inner shaft as a torque is transmitted as a force in the circumferential direction from the rolling body raceway of the inner shaft via the rolling face to the rolling body, and from the latter via its other rolling face to the rolling body raceway of the outer shaft. The rolling bodies therefore serve as positively locking elements which are arranged in a positively locking manner between the rolling faces with regard to a transmission of force in the circumferential direction. In the longitudinal direction, the rolling bodies roll with low rolling friction, with the result that they can be inserted virtually without play between the rolling body raceways. This has the advantage that a steering torque which is input is transmitted practically without play, which makes reliable, precise and low-noise steering possible.

In order to continue to ensure a basic steering function in the case of an emergency when the rolling bodies for the transmission of the torque fail, for example as a result of fracture or removal from the positively locking connection, it is known from DE 10 2014 017 555 A1 to provide a replacement coupling between the inner shaft and the outer shaft. Said replacement coupling has a securing element in the form of a stop element which is fixed on the free end of the outer shaft and has an opening cross section with supporting bodies which engage in each case in a positively locking manner into the rolling body raceways and slide directly on the surface of the rolling body raceways. As a result of the friction which is unavoidable in the process, the adjusting force which is required for the adjustment in the longitudinal direction can be increased in an undesired way, however, in particular in the long term when the sliding surfaces are roughened by way of abrasive particles or the effect of lubricants which are used declines.

Furthermore, EP 3 037 322 A2 and EP 3 045 378 A2 have disclosed arranging shock-absorbing buffer bodies in the rolling body raceways. Said shock-absorbing buffer bodies consist of relatively soft materials, however, and can serve only to hold the rolling bodies in the rolling body raceways and to damp a contact in the longitudinal direction. Said buffer bodies are unsuitable as an emergency system for the transmission of the steering torque in the case of the failure of the rolling bodies. Moreover, friction likewise occurs between the inner shaft and the outer shaft as a result of the buffer bodies.

Thus a need exists for an improved steering shaft which provides a smooth adjustment and increased safety in the case of failure of rolling bodies.

SUMMARY

The invention relates to a steering shaft for a motor vehicle. The shaft includes an outer shaft which is configured as a hollow shaft and in which an inner shaft is arranged coaxially. The inner shaft can be telescoped relative to the outer shaft in the direction of the longitudinal axis of the steering shaft and is connected in a torque-transmitting manner to the outer shaft via at least one rolling body. The rolling body can roll in the direction of the longitudinal axis, and said rolling body bearing in a positively locking manner in the circumferential direction with regard to a rotation about the longitudinal axis between rolling body raceways on the inner shaft and on the outer shaft. The steering shaft includes, furthermore, a securing element which has at least one supporting body which is arranged between supporting faces which are configured on the inner shaft and on the outer shaft, which at least one supporting body can be supported in a positively locking manner in the circumferential direction.

In some examples, the supporting body is spaced apart in the circumferential direction from the supporting faces.

According to the invention, the supporting body is arranged with a defined play in the circumferential direction between the supporting faces, with the result that it is spaced apart from the inner shaft, the outer shaft, or from the two shafts, that is to say can be moved in the longitudinal direction relative to the supporting face without contact in the longitudinal direction, and is not in frictional contact as in the prior art. There is no continuous contact between the supporting body and the inner shaft and the outer shaft in normal operation and, as a consequence, no transmission of force takes place via the supporting body between the inner shaft and the outer shaft. This achieves a situation where the adjusting force is not increased in an undesired way as a result of friction between the supporting body and the supporting faces.

The securing function is ensured by virtue of the fact that, according to the invention, a supporting body is arranged in the loose positively locking connection between the supporting faces. As long as the rolling bodies which serve for the transmission of torque in normal operation are arranged in an undamaged state in the rolling body raceways, no torque can be transmitted via the supporting bodies to the supporting faces which are spaced apart from them. If rolling bodies are damaged or removed, however, the positively locking engagement between the rolling body raceways via the rolling bodies is canceled, and the inner shaft can be rotated relative to the outer shaft. In this case, the supporting body is moved in the circumferential direction until it comes into contact with the supporting face, that is to say bears against the supporting face in the circumferential direction, with the result that it is brought into engagement with the supporting face in order to form a positively locking connection which acts in the circumferential direction and via which a torque can be transmitted between the inner shaft and the outer shaft. As a result, the steering function is ensured in the case of an emergency.

A supporting body is preferably manufactured from a material which is suitable for absorbing the mechanical loads which occur when a securing element according to the invention is brought into a positively locking engagement for the transmission of torque in the case of an emergency. Here, high shear loads are exerted via the supporting faces, which shear loads are not to endanger the function of the supporting body. Therefore, a metallic material is preferably used which has a high fracture and tensile strength, for example steel.

One or more supporting bodies can be provided which are attached in each case between corresponding supporting faces. In normal operation, no forces act between the supporting bodies and the supporting faces which are spaced apart from them; the supporting bodies assume the function as torque transmission elements only in the case of the failure of the rolling bodies. As a result, a redundant system is formed which provides increased safety in emergency operation, but does not impair the function in normal operation.

The securing element can be connected fixedly to the inner shaft or the outer shaft. Here, a supporting body can be fixed on the inner shaft and, according to the invention, is at a spacing in the circumferential direction from a supporting face on the outer shaft, or vice versa. The supporting body can be capable of being displaced linearly in the axial direction together with the inner shaft or outer shaft, and is not capable of rolling like the rolling bodies in between. The fixing of the supporting body on the inner shaft or outer shaft can take place independently of the securing of the rolling bodies, with the result that an independent redundant function in the case of an emergency is ensured.

The invention can be realized by virtue of the fact that a supporting body is arranged between the rolling body raceways, the supporting faces being configured in the region of the rolling body raceways. Here, the existing inner faces of the groove-shaped rolling body raceways, between which, in normal operation, the rolling bodies are arranged substantially without play, that is to say without a spacing in the circumferential direction, are utilized as a supporting face for the securing element. To this end, at least one supporting body such as a rolling body is arranged in a position in the circumferential direction between the rolling body raceways. In contrast to a rolling body, however, a supporting body according to the invention does not bear at the same time against the two rolling body raceways of the inner shaft and outer shaft, but is at a spacing in the circumferential direction at least from a supporting face which is arranged in the region of the rolling body raceways. As a result, the existing rolling body raceways can be utilized as supporting faces for the redundant securing system without additional manufacturing complexity. In the case of an emergency when a rolling body fails, a supporting body assumes the function of the latter of the transmission of torque between the rolling body raceways.

It can be provided that a supporting body has a smaller cross-sectional dimension, as viewed in the circumferential direction, than a rolling body. This can achieve a situation where a supporting body which is arranged next to a rolling body within the rolling body raceways does not bear at the same time against the two rolling body raceways, as said rolling body does, but rather is at a spacing in the circumferential direction at least from a rolling body raceway or a supporting face which is configured in the region of the rolling body raceway. The spacing can be realized by virtue of the fact that the cross section (measured in the circumferential direction) of a supporting body between the rolling faces of a rolling body on at least one of the rolling body raceways, for example the contact faces of a ball which lie opposite one another in the circumferential direction in the groove-shaped rolling body raceway in the outer shaft, has a smaller dimension than a rolling body. By virtue of the fact that the cross section in the circumferential direction in said region is narrower than the cross section of a rolling body, the supporting body exhibits play with respect to the rolling body raceway in contrast to the rolling body, and can be moved without contact in the longitudinal direction in normal operation in the case of intact rolling bodies.

The securing element can have a carrier part, to which at least one supporting body is attached. By way of the carrier part, one or more supporting bodies can be secured and can be positioned relative to the supporting faces. For example, a carrier part can be fixed on the inner shaft or the outer shaft, with the result that a supporting body is held according to the invention at a position at a defined spacing from a supporting face.

One advantageous embodiment of the invention provides that the carrier part extends in a laminar manner in a cross-sectional plane perpendicularly with respect to the longitudinal axis, and at least one supporting body projects from the carrier part in the direction of the longitudinal axis. A carrier part of this type can be manufactured particularly efficiently from sheet metal, for example as a punched part from steel sheet. One or more supporting bodies can be attached to the carrier part by means of suitable fastening means, with the result that they project from the surface of the carrier part. It is advantageous here that at least two supporting bodies are arranged in a mirror-symmetrical manner with regard to the longitudinal axis, and are preferably arranged so as to lie opposite one another. The arrangement of the supporting bodies can preferably correspond with the arrangement of rolling body raceways of the inner shaft or the outer shaft. As a result, it is possible that a plurality of supporting bodies are attached to a securing element, which supporting bodies can be fixed in a positionally accurate manner with a spacing according to the invention from the associated supporting faces by way of positioning of the securing element. The assembly is simplified as a result.

The carrier part can be configured, for example, as a plate-shaped, flat body which is fixed on the end side at the free end of the inner shaft. The supporting body or supporting bodies can engage into the cross sections of the rolling body raceways, which cross sections are open on the end side.

It can be provided, furthermore, that at least two supporting bodies are pressed by the carrier part with respect to one another in a sprung manner against the inner shaft or the outer shaft. For this purpose, the carrier part can be of spring-elastic configuration, to which carrier part two supporting bodies which lie opposite one another in pairs with regard to the longitudinal axis are attached in a sprung manner with respect to one another. As a result, the securing element can be fastened simply by virtue of the fact that, for example, the inner shaft is clamped in between the supporting bodies, that is to say the securing element is clamped onto the inner shaft. The supporting bodies therefore serve at the same time as fastening means for fixing the securing element on the inner shaft. It is particularly advantageous here that the supporting bodies are received in a spring-loaded manner in rolling body raceways or similar recesses of the inner shaft.

As an alternative or in addition, it is conceivable and possible that one or more supporting bodies are pressed in a sprung manner against the outer shaft for fixing purposes. For example, the securing element can be clamped into the opening cross section of the outer shaft, with the result that the supporting bodies are pressed in a sprung manner into the rolling body raceways.

The invention can be realized by virtue of the fact that the securing element is configured as a single-piece shaped sheet metal part, at least one supporting body being configured as a bent portion. A shaped sheet metal part of this type can comprise, for example, an elongate, strip-shaped sheet metal section, that is to say a metal strip, which extends in a plane transversely with respect to the longitudinal axis. At least one of the end sections, preferably the two end sections, of the sheet metal section is/are bent over toward the same side of the sheet metal section about bending axes which lie transversely with respect to the longitudinal axis and with respect to the longitudinal extent of the sheet metal section, parallel to a circumferential direction. Said bent portions form supporting bodies according to the invention which project in the axial direction from the sheet metal strip on one side. Here, the sheet metal strip forms a carrier part which is configured in one piece with the supporting bodies.

The strip-shaped sheet metal section can be bent over in the bent portions to such an extent that the free ends are directed against the longitudinal axis or point counter to one another. This can be realized by way of bending over between 90° and 270°, bending over by 180° bringing it about that the free ends lie perpendicularly with respect to the longitudinal axis and are oriented toward one another parallel to the longitudinal extent of the sheet metal section.

The above-described embodiment from a sheet metal strip realizes a bracket-shaped securing element. By virtue of the fact that the sheet metal strip is preferably manufactured from steel sheet or spring steel sheet, the sheet metal section which connects the supporting bodies forms a carrier part which is sprung in a resiliently flexible manner. As a consequence, the supporting bodies which are realized by way of bending over operations of the end regions are connected to one another such that they are sprung against one another. As a result, it is possible to clamp the securing element fixedly on an inner shaft, by the carrier part being arranged parallel to the free end side, the supporting bodies which are directed counter to one another engaging around the inner shaft and clamping it between themselves in a sprung manner as a result of the elasticity of the sheet metal strip. Here, the free ends of the sheet metal strip are pressed against the inner shaft in the radial direction, transversely with respect to the longitudinal axis.

In the form which is described in the preceding text, the securing element can be configured as a sheet metal strip with two supporting bodies which lie opposite one another in pairs relative to the longitudinal axis and are configured by way of bending over operations, with the result that a bracket-like arrangement is realized. As a result, the supporting bodies can engage into rolling body raceways which lie opposite one another. It is likewise possible to configure the basic shape of the shaped sheet metal part in a polygonal, cross-shaped or star-shaped manner, it being possible for supporting bodies to be attached in the corners or the free end sections of the arms which project in a cross-shaped or star-shaped manner. In this way, for example, four supporting bodies can be realized in a geometric arrangement which corresponds to the arrangement of four rolling body raceways of an inner shaft, with the result that the supporting bodies can be fixed in a positionally accurate manner relative to the rolling body raceways by means of an assembly operation, for example by way of being clamped fixedly. Accordingly, arrangements with different numbers of supporting bodies can be realized, which supporting bodies can be arranged symmetrically or else irregularly with respect to the respective shaft depending on the arrangement which is envisaged.

For fastening on the inner shaft, the securing element is fixed from the outside, that is to say on the outer circumference, for example is clamped in in a sprung manner between elastically held supporting bodies, as described, and is clamped fixedly as a result. The attachment from the outside can preferably take place within the open cross section of the groove-shaped rolling body raceways. Fastening in the outer shaft is likewise possible, the supporting bodies correspondingly being spread open to the outside in a sprung manner, with the result that they are pressed from the inside against the inner wall of the outer shaft, preferably within the rolling body raceways.

The fastening of the securing element by way of being clamped fixedly on the inner shaft or outer shaft can be improved by virtue of the fact that at least one supporting body has a fixing means which can be fixed on the inner shaft or the outer shaft. A fixing means can comprise, for example, a friction-increasing configuration or coating of the surface which is pressed against the surface of the inner shaft or outer shaft in the case of a supporting body which is clamped on in a sprung manner, and ensures frictionally locking fixing of the supporting body. It is likewise possible to configure that region of the supporting body which bears against the surface with a claw-like, blade-like or mandrel-like fixing means which is buried into the surface of the inner shaft or outer shaft when clamped fixedly and ensures positively locking and frictionally locking fixing of the supporting body, in particular in the direction of the longitudinal axis. As an alternative, the fastening of the securing element can take place by means of a screw which is screwed into a threaded bore which is configured in the end side of the inner shaft. The screw extends through a bore in the carrier part of the securing element.

As described above, the supporting bodies can be produced in one piece from a shaped sheet metal part made from steel or spring steel by way of bending over operations. As an alternative, supporting bodies which possibly consist of different materials can be attached to a carrier part. The carrier part can be configured as a shaped sheet metal part, or else as a pressed or bent part which is made from metallic or non-metallic materials. A configuration as a plastic part, preferably as an injection molded plastic part, is likewise conceivable and possible. The fastening of the supporting body or supporting bodies to the carrier part can take place as described by way of production in one piece, or else by way of integrally joined, positively locking and/or non-positive connections.

As an alternative, the invention can be realized by virtue of the fact that the carrier part extends in the direction of the longitudinal axis, and the supporting body is formed on a section which is bent over in a U-shaped manner from the carrier part, a free end of the outer shaft being received between the carrier part and the supporting body. In this embodiment, a holding slot is delimited by the carrier part and the U-shaped section which is bent back substantially by 180°. By way of the opening of the holding slot, the carrier part can be plugged in a clip-like manner onto the wall in the end-side region of the opening of the outer shaft, with the result that the carrier part extends to the outside on the outer shaft, and the bent-over section dips into the opening cross section of the outer shaft. A supporting body is attached to said section which dips into the outer shaft, for example also in the form of a bent portion of a shaped sheet metal part. In this way, for example, the supporting body can be held within the open cross section of a rolling body raceway. It is likewise possible that the inner shaft has a polygonal cross section, for example is designed as a square profile. According to the invention, the supporting body or supporting bodies are at a spacing from the side faces of the polygonal profile in normal operation. In the case of a relative rotation of the polygonal profile within the outer shaft, which relative rotation can take place only in the case of the failure of the rolling bodies, the edge regions come into contact with the supporting body or the supporting bodies, with the result that a transmission of torque is ensured in the case of an emergency.

It is likewise conceivable and possible that the at least one rolling body, preferably a plurality of rolling bodies, is/are secured such that it/they can roll in a cage which can be moved relative to the inner shaft and to the outer shaft in the direction of the longitudinal axis, a supporting body being attached to the cage. The cage serves as a rule to receive a plurality of rolling bodies such that they can be rotated loosely, and to position them relative to one another in the rolling direction, that is to say in the longitudinal direction. As a consequence, the cage moves relative to the inner shaft and outer shaft in the longitudinal direction together with the rolling bodies which are rolling. A supporting body according to the invention can be attached to the cage and is distinguished by the fact that the cross section is smaller than that of a rolling body, but is large enough to interact according to the invention with supporting faces in the region of the rolling body raceways in the case of the failure of the rolling bodies.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
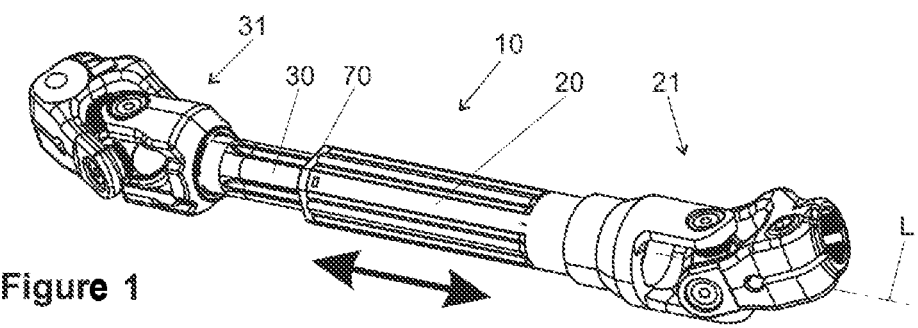
FIG. 1 is a diagram view of a steering shaft.

FIG. 1 shows a perspective view of a diagrammatically shown steering shaft 10 which has an outer shaft 20 (also called an outer hollow shaft) and an inner shaft 30 (also called an inner hollow shaft) which can be telescoped relative to one another in the direction of the longitudinal axis L, that is to say in the longitudinal direction which is indicated by way of the double arrow.

At its outer free end which faces away from the inner shaft 30 in the longitudinal direction, the outer shaft 20 has a fork 21 which forms a part of a universal joint, by way of which the steering shaft 10 is connected to the steering train in a torque-transmitting manner. Correspondingly, at its free end which faces away from the outer shaft 20 in the longitudinal direction, the inner shaft 30 has a fork 31 which forms a part of a further universal joint, by way of which the steering shaft 10 is connected to the steering train in a torque-transmitting manner. The inner shaft 20 and the outer shaft 30 are preferably manufactured from steel which can be cold worked satisfactorily.

A stop element 70 which acts in the direction of the longitudinal axis of the steering shaft 10 is inserted into the opening of the outer shaft 20. The inner shaft 30 is guided through such that it can be displaced by way of the stop element 70.

Figure 2:
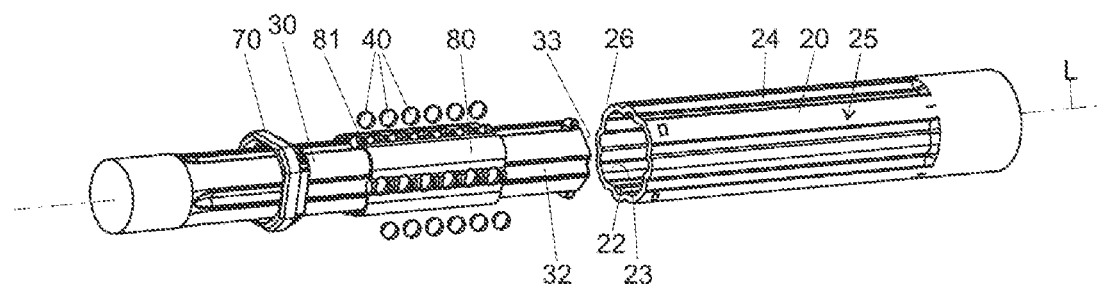
FIG. 2 is a diagram view of a part of a steering shaft in accordance with FIG. 1 in the dismantled state.

FIG. 2 shows a part of the steering shaft 1 in accordance with FIG. 1 in an exploded illustration, in the case of which the individual constituent parts are shown in the dismantled state. It is apparent from this that the outer shaft 20 is profiled in its circumferential region which faces the inner shaft 30 and into which the inner shaft 30 can be pushed in a telescoping manner in the longitudinal direction. The profiling of the outer shaft 20 comprises grooves 22 which extend in the longitudinal direction in the inner casing surface 23. Convexly projecting bead-like shaped-out formations 24 are configured in the outer casing surface 25 so as to lie opposite the grooves 22 on the outside with regard to the wall of the outer shaft 20. In the embodiment which is shown, both the inner shaft 30 and the outer shaft 20 are configured as hollow profiles with a substantially square cross-sectional basic shape. Here, a total of four grooves 22 are arranged distributed uniformly over the circumference of the outer shaft 20, namely in each case in the center of one of the sides of said square cross section. The grooves 22 are configured as rolling body raceways, specifically as ball raceways.

That end section of the inner shaft 30 which faces the outer shaft 20 and can be pushed into the latter in a telescoping manner (as shown in FIG. 1) is likewise profiled. The profiling comprises grooves 32 which extend from the end which can be plugged into the outer shaft 20 in the outer casing surface 33 of the inner shaft 30 in the longitudinal direction, that is to say in the direction of the longitudinal axis L. The grooves 32 extend over that part section of the inner shaft 30 which can be pushed into the outer shaft 20 in the longitudinal direction.

A securing element 9 according to the invention which will be described in greater detail further below is arranged on the inner shaft 30 in the region of its end side 33 which faces the end side 26 of the outer shaft 20 and is situated within the outer shaft 20 in the assembled state.

Figure 3:
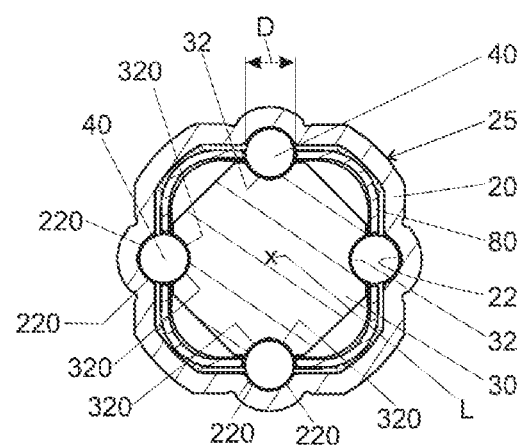
FIG. 3 is a cross-sectional view of a steering shaft in accordance with the preceding figures.
Figure 15:
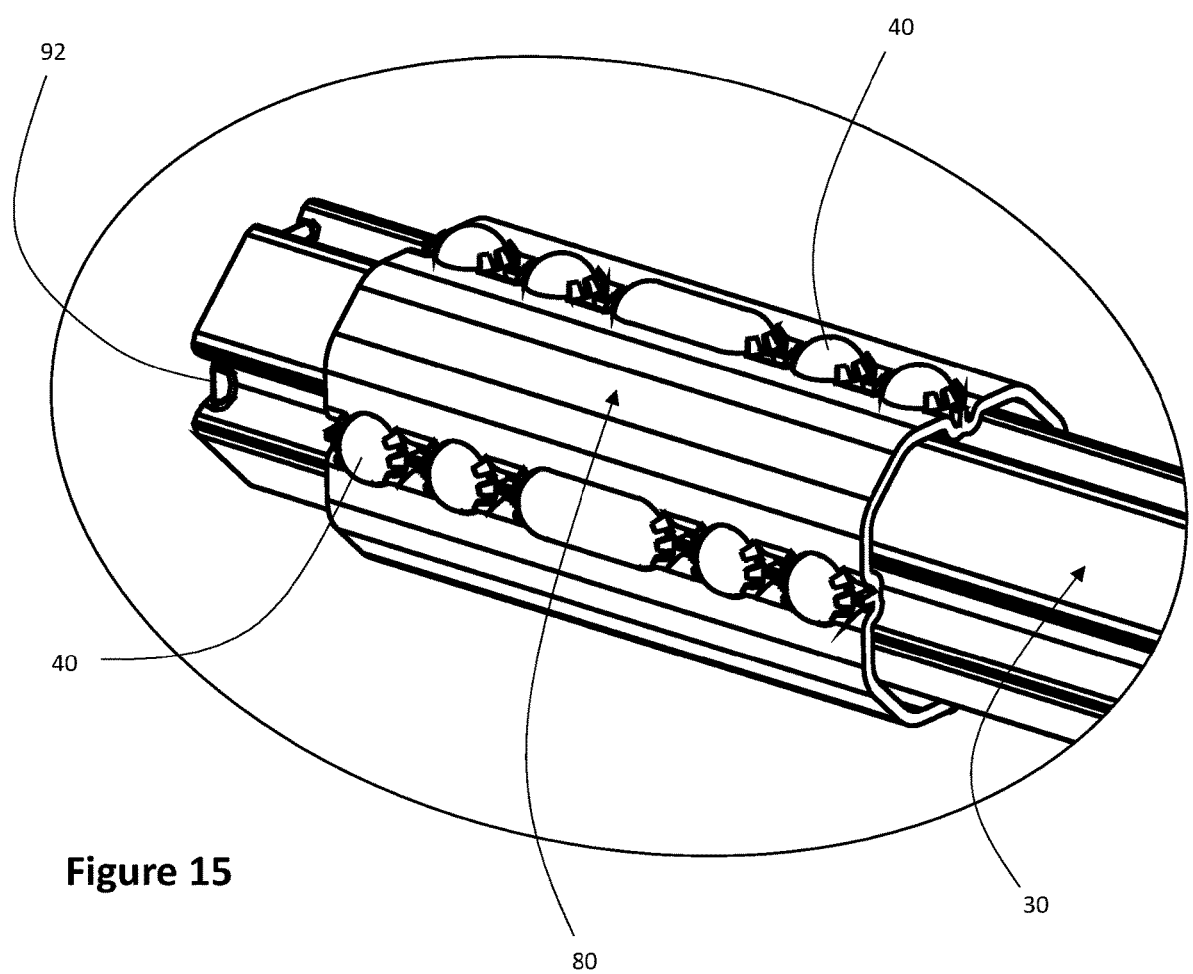
FIG. 15 is a detail perspective view of the example cage shown in FIG. 2.

It can be seen clearly from FIG. 2 in combination with the cross-sectional illustration in FIG. 3 how rolling bodies, namely balls 40, are arranged radially between the grooves 22 and 32. A plurality of balls 40 are arranged behind one another in the longitudinal direction in each case in the grooves 22 and 32. Here, they can be rotated freely in a sleeve-shaped rolling body cage or ball cage 80, as shown in FIG. 2 and more closely in FIG. 15, such that they are held at a defined spacing relative to one another. A ball or balls 40 may be secured such that it/they can roll in the cage 80, which is movable relative to the inner shaft 30 and to the outer shaft 20 in the direction of the longitudinal axis L.

The embodiment which is shown in FIG. 3 shows a rectangular, specifically a square, base cross section of the shafts 20 and 30. The grooves 22 and 32 are arranged in each case centrally in one side of the square symmetrically with respect to the longitudinal axis L.

The balls 40 have a diameter D and are received in each case between grooves 22 and 32 which lie opposite one another in pairs such that said balls 40 can roll in the longitudinal direction. The balls 40 bear substantially without play by way of their circular cross section against contact faces 220 and 320 in the grooves 22 and 32. As a result, the balls 40 form positively locking elements which establish a positively locking connection which acts in the circumferential direction between the grooves 22 and 32 and which, as a result, connect the inner shaft 30 and the outer shaft 20 to one another in a positively locking manner with regard to a rotation about the longitudinal axis L.

Figure 4:
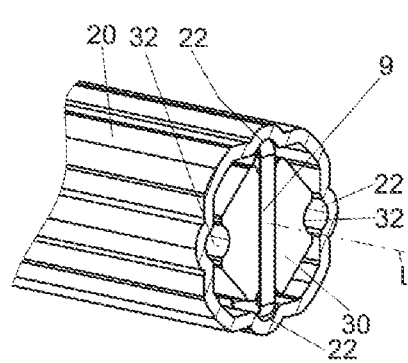
FIG. 4 is a partial perspective view of a diagram of a cross section A-A through a steering shaft in accordance with FIG. 1.
Figure 4A:
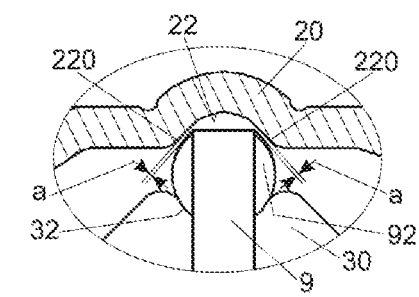
FIG. 4a is a cross-sectional view of a detailed part of the steering shaft in accordance with the preceding figures.

The configuration of a securing element 9 in a first embodiment is shown in FIG. 4. In said figure, the outer shaft 20 is cut away in the cross section A-A in the assembled state in accordance with FIG. 1, and reveals a view of the end side 33 of the inner shaft 30. FIG. 4 shows the securing element 9 in the installed position within the steering column 10, FIG. 4a shows a detailed part of a cross-sectional view of the steering shaft, FIG. 5 shows a perspective illustration in the dismantled state in accordance with FIG. 2, and FIG. 6 shows said securing element 9 on its own in the state, in which it has been removed from the inner shaft 30.

The securing element 9 has a strip-shaped, flat carrier part 91 which extends radially over the end side 33 in a manner which bears against said end side 33 transversely with respect to the longitudinal axis L, that is to say said carrier part 91 is arranged parallel to a cross-sectional area. Supporting bodies 92 are attached to the carrier part 91 at the end regions which lie opposite one another with regard to the longitudinal axis L. The supporting bodies 92 project from the carrier part 91 in the longitudinal direction against the end side 33, and are shaped in the example which is shown as bent portions about bending axes U which lie in each case transversely with respect to the longitudinal axis L and with respect to the radial extent of the carrier part 91, that is to say in the circumferential direction. As a result, the securing element 9 has a bracket-shaped basic shape.

The supporting bodies 92 have free end regions 93 which are bent over by approximately 180° in relation to the radial extent of the carrier part 91, to be precise so as to point counter to one another in the direction of the spring force F which is indicated by way of the arrows in FIG. 6 and will be described further below.

Figure 5:
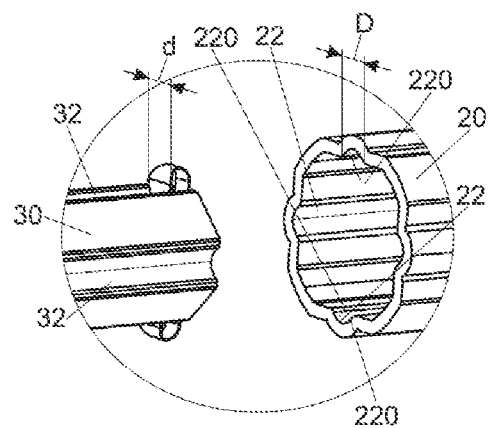
FIG. 5 is a perspective view of the steering shaft in accordance with FIG. 4 in the dismantled state.
Figure 6:
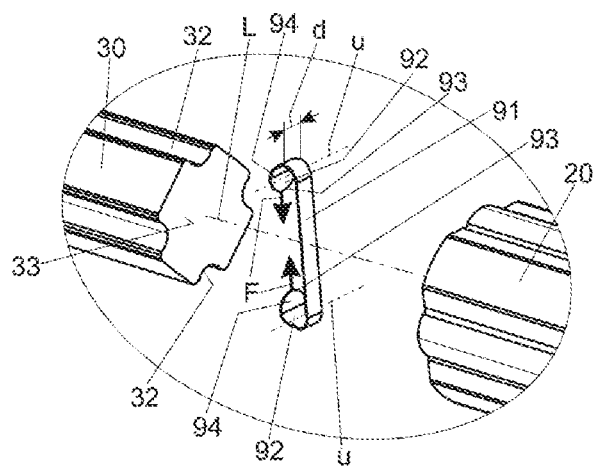
FIG. 6 is a perspective view of the steering shaft in accordance with FIG. 5 in the further dismantled state.

In the installed position in accordance with FIGS. 4 and 5, the end regions 93 which lie radially opposite one another engage into opposite grooves 32 of the inner shaft 30. By virtue of the fact that the carrier element 91 and/or the bent portions of the supporting bodies 92 are/is configured in a spring-elastic manner and the free spacing of the end regions 93 is smaller than the diameter of the inner shaft 30 in the region of the grooves 32 which lie opposite one another, the inner shaft 30 is clamped in between the supporting bodies 92 by way of the spring force F, the free end regions 93 being pressed with their outer edges against the outer surface of the inner shaft 30. In other words, the securing element 9 is clamped fixedly and directly on the inner shaft 30 on the end side, as shown in FIGS. 4 and 5 amongst others. The holding strength of the clamped connection can be increased by virtue of the fact that the end regions 93 have fixing means on their regions which bear against the surface of the inner shaft 30, for example blade-shaped or mandrel-shaped sharp edges which dig into the surface of the inner shaft 30 and ensure a secure seat of the fixing element on the inner shaft 30.

The securing element 9 is preferably configured as a single-piece shaped sheet metal part, to be precise preferably as a stamped bent part made from steel sheet or spring steel sheet. As a result, the supporting bodies 92 are inherently resiliently flexible and are connected to the carrier part 91 in a sprung manner.

In the supporting region 94 which projects beyond the open cross section of the groove 32 and extends into the grooves 22 of the outer shaft 20, the supporting body 92 has a width d which is smaller than the diameter D of the balls 40. As a result, the supporting body 92 is at a spacing a in the circumferential direction from the inner face of the groove 22, as shown in FIG. 4a.

The end region 93 of the supporting body 92 can preferably be formed in such a way that it is inserted in a positively locking manner in the circumferential direction from the outside into the open cross section of a groove 32 of the inner shaft 30, with the result that the securing element 9 is seated fixedly on the end side 33 so as to rotate with it relative to the longitudinal axis L. This ensures that the spacing a between the supporting body 92 and the outer shaft 20 is maintained, with the result that the supporting body 92 is arranged without contact and, in normal operation during the adjustment of the inner shaft 30 in the longitudinal direction, no undesired friction occurs between the supporting body 92 and the outer shaft 20.

If a steering command is introduced via a steering wheel (not shown) into the inner shaft 30 as a torque about the longitudinal axis L, said command is transmitted in normal operation (in the case of intact balls 40 which are situated in the grooves 22 and 32) as a force in the circumferential direction from the inner shaft 30 via the contact faces 320 to the balls 40, and from said balls 40 via the contact faces 220 to the outer shaft 20. In the case of an emergency, if the balls 40 are destroyed or have been removed from the grooves 32 and 22, the supporting bodies 92 come into contact with the inner faces of the grooves 32 which then serve as supporting faces within the context of the invention, for example in the region of the contact faces 220 and 320. Only then do the supporting bodies 92 at the same time come into positively locking contact between the inner shaft 30 and the outer shaft 20, and take the place of the balls 40 which are no longer intact in the case of an emergency. The transmission of torque then takes place from the inner shaft 30 via the supporting body or the supporting bodies 92 and the inner faces of the grooves to the outer shaft 20.

Figure 7:
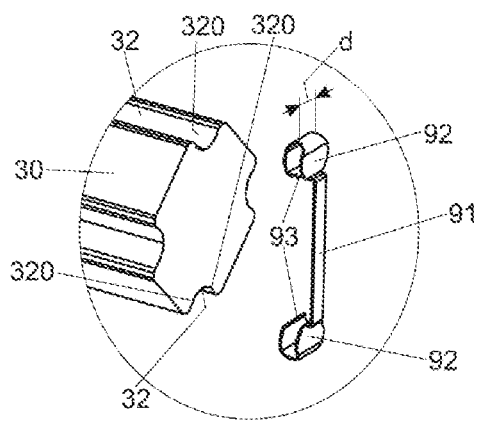
FIG. 7 is a perspective view of a second embodiment of a steering shaft in a similar illustration to FIG. 6.
Figure 8:
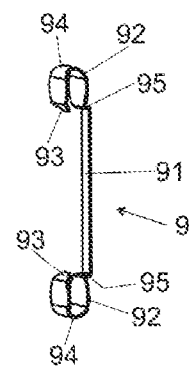
FIG. 8 is a perspective view of a securing element of the steering shaft in accordance with FIG. 7.

The advantageous effects which have been described can likewise be achieved by way of the embodiment (shown in FIGS. 7 and 8) of another example securing element 1000. Like the first embodiment, this embodiment is likewise manufactured as a single-piece stamped bent part preferably made from steel sheet or spring steel sheet. In contrast to the first embodiment, the carrier part 1002 is narrower, on which the supporting bodies 1004 are integrally formed via additional offsets 95. As a result, the supporting bodies 1004 are offset in the longitudinal direction from the carrier part 1002, and engage into the groove 32 twice, that is to say on both sides.

Figure 9:
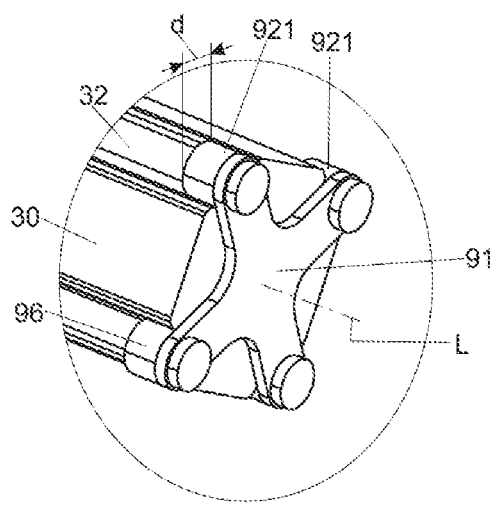
FIG. 9 is a perspective view of an inner shaft of a steering shaft in a third embodiment.

One alternative embodiment of a securing element 2000 is shown in FIG. 9. Said securing element 2000 has a plate-shaped, flat (or "planar") carrier part 2002 which is of cross-shaped configuration with four radially projecting arms. Substantially cylindrical supporting bodies 921, which are shown as complete cylinders in FIG. 9, are attached to the arms, the axial directions of which supporting bodies 921 lie parallel to the longitudinal axis L. As in the case of the above-described embodiments, the carrier part 2002 is arranged parallel to the end side 33 of the inner shaft 30. Likewise as described, the securing element 2000 can be clamped fixedly between the supporting bodies 921 on the inner shaft 30. The diameter d of the supporting bodies 921 is once again smaller than the diameter D of the balls 40, with the result that, in the case of intact balls 40, the supporting bodies 921 are at a spacing from the contact faces 220 of the grooves 22 and are therefore at a spacing in the circumferential direction from supporting faces of the outer shaft 20.

The carrier part 2002 can be configured, for example, as a plastic part, for example as an injection molded plastic part, or as an alternative as a stamped sheet metal part. The supporting bodies 921 which can preferably consist of a resistant, durable material such as steel can be integrally molded on the carrier part 2002, or can be connected in an integrally joined, positively locking and/or non-positive manner. It can be provided in one embodiment (not shown) that the carrier part 2002 is fixed on the inner shaft by means of a screw. To this end, a threaded bore is provided in the end side 33 of the inner shaft 30, into which threaded bore the screw is screwed. As an alternative, it can also be provided that the carrier part 2002 is fixed on the end side 33 of the inner shaft 30 by means of a spot welding operation.

Figure 10:
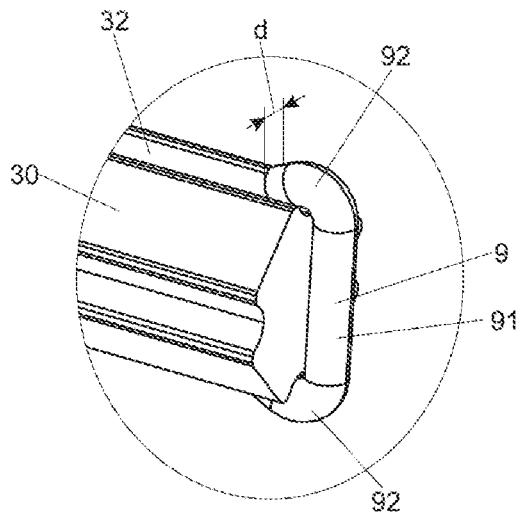
FIG. 10 is a perspective view of an inner shaft of a steering shaft in a fourth embodiment.

A further alternative embodiment is shown in FIG. 10. This example securing element 3000 is a bent part made from profile material, from a wire with a round cross section in the example which is shown, which has a diameter d which is smaller than the diameter D of the balls 40. The supporting bodies 3002, connected by a carrier part 3004, are once again formed by way of simple bent portions which engage into the grooves 32 on the end side 33 of the inner shaft 30.

Figure 11:
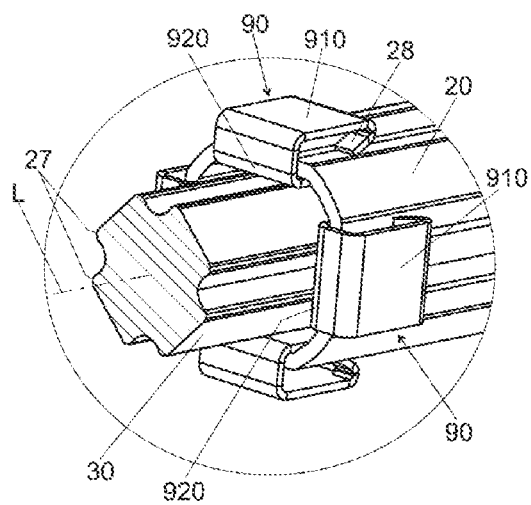
FIG. 11 is a partial perspective diagram of a steering shaft in a fifth embodiment.
Figure 12:
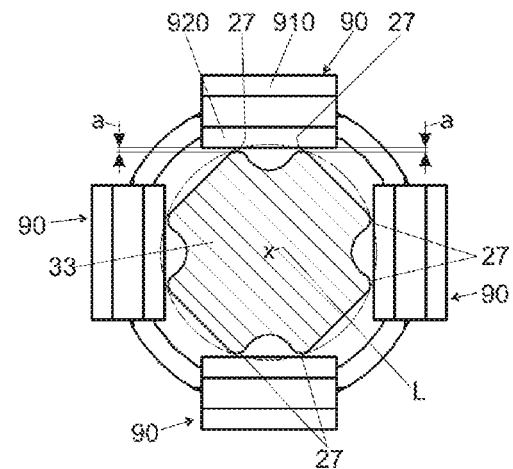
FIG. 12 is a cross-sectional view of the steering column in accordance with FIG. 11.

One alternative embodiment of the invention is shown in FIGS. 11 and 12. This design has a carrier part 910 and a supporting body 920. A holding slot is delimited by the carrier part 910 and the section which is bent back substantially by 180° in a U-shaped manner, by way of which holding slot the securing element 90 is plugged in a clip-like manner onto the wall in the end-side region of the opening of the outer shaft 20, with the result that the carrier part 910 extends on the outside on the outer shaft 20, and the bent-over section which forms the supporting body 920 dips into the opening cross section of the outer shaft 20. In other words, as shown in FIGS. 11 and 12, the securing element or elements 90 may be attached to a longitudinal end of the outer shaft 20 and may protrude longitudinally from the outer shaft 20. The carrier part 910 has spring-elastic holding sections 28 which bear from the outside against the outer shaft 20 in a sprung manner and, as a result, clamp the securing element 90 fixedly.

The inner shaft 30 has a polygonal cross section with a square basic shape, with grooves 32 which run in the edge regions. Supporting faces 27 are situated along the grooves 32. In the operating state which is shown, the supporting faces 27 are at the spacing a from the supporting bodies 920, and therefore do not establish a connection between the inner shaft 30 and the outer shaft 20. Furthermore, FIGS. 11 and 12 show that multiple securing elements 90 may be circumferentially spaced apart and only indirectly connected to one another, in some cases, by the outer shaft 20.

Only in the case of the failure of the rolling bodies in an emergency, a relative rotation of the inner shaft 30 within the outer shaft 20 can occur. The supporting faces 27 then come into contact with a force component in the circumferential direction against the supporting body or the supporting bodies 920, with the result that a transmission of torque can take place from the inner shaft 30 via the securing elements 90 to the outer shaft 20.

Figure 13:
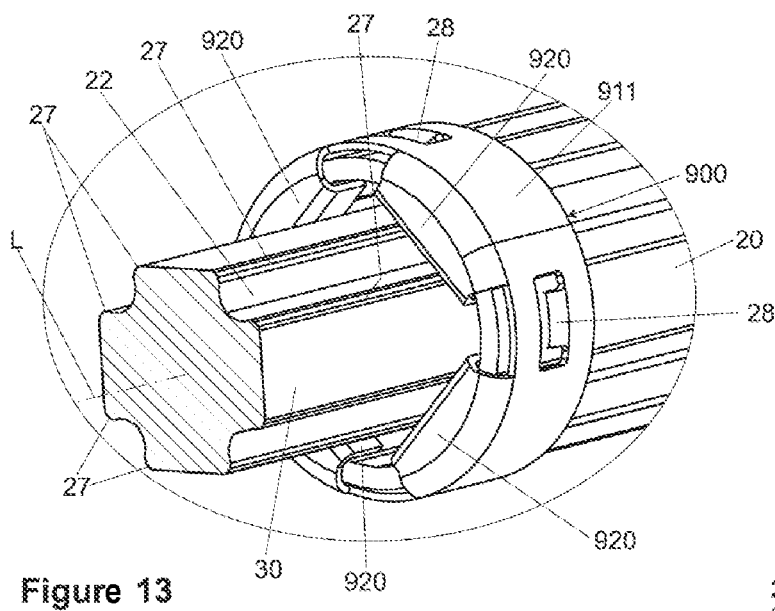
FIG. 13 is a perspective view of still another example securing element that can be secured to a longitudinal end of an outer shaft and can permit an inner shaft to pass through its central opening.
Figure 14:
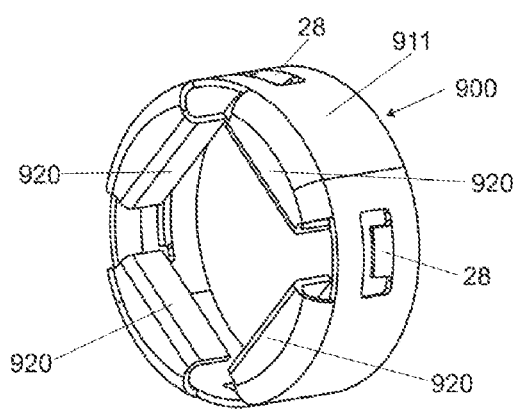
FIG. 14 is another perspective view of the securing element shown in FIG. 13.

The design which is shown in FIGS. 13 and 14 functions in principle in the same way as the above-described embodiment, the securing element 900 having a total of four supporting bodies 4000 which are arranged on a single annular carrier part 911 which is coaxial with respect to the longitudinal axis L. The carrier part 911 is fastened in a cap-like manner on the open end of the outer shaft 20 such that it is secured against rotation, as a result of which the assembly is simplified.

The securing elements 90 and 900 can preferably be manufactured as stamped bent parts made from metal sheet, preferably from steel sheet or spring steel sheet.

LIST OF DESIGNATIONS

- 10 Steering shaft
- 20 Outer shaft
- 21 Fork
- 22 Groove
- 26 End side
- 220 Contact face
- 23 Inner casing surface
- 24 Shaped-out formations
- 25 Outer casing surface
- 27 Supporting faces
- 28 Spring-elastic holding sections
- 30 Inner shaft
- 31 Fork
- 32 Groove
- 320 Contact face
- 33 Outer casing surface
- 33 End side
- 40 Ball
- 70 Stop element
- 80 Rolling body cage
- 9, 90, 1000, 2000, 3000 Securing element
- 91, 910, 911, 1002, 2002 Carrier part
- 92, 920, 921, 1004, 3002, 4000 Supporting body
- 94 Supporting region
- 95 Offset
- a Spacing
- D Diameter
- d Width of the supporting element
- L Longitudinal axis

The invention claimed is:

1. A steering shaft for a motor vehicle, comprising:
    a hollow outer shaft;
    an inner shaft arranged coaxially in the outer shaft;
    the inner shaft configured to telescope relative to the outer shaft in the direction of a longitudinal axis of the steering shaft, the inner shaft connected in a torque-transmitting manner to the outer shaft via rolling bodies,
    wherein the steering shaft is configured to permit the rolling bodies to roll in the direction of the longitudinal axis,
    wherein the rolling bodies bear in a positively locking manner in the circumferential direction with regard to a rotation about the longitudinal axis between rolling body raceways formed on the inner shaft and on the outer shaft; and
    a securing element including a supporting body arranged between supporting faces configured on the inner shaft and on the outer shaft and supported in a positively locking manner in the circumferential direction, wherein the securing element is clamped fixedly and directly to the supporting faces of the inner shaft,
    wherein the supporting body is spaced apart in the circumferential direction from the supporting faces on the outer shaft.

2. The steering shaft of claim 1, wherein the supporting body is arranged between the rolling body raceways, the supporting faces being configured in the region of the rolling body raceways.

3. The steering shaft of claim 1, wherein the supporting body has a smaller dimension in the circumferential direction between rolling faces of the rolling bodies on at least one of the rolling body raceways than a rolling body.

4. The steering shaft of claim 1, wherein the securing element has a carrier part, to which the supporting body is attached.

5. The steering shaft of claim 4, wherein the carrier part extends in a laminar manner in a cross-sectional plane perpendicularly with respect to the longitudinal axis, and the supporting body projects from the carrier part in the direction of the longitudinal axis.

6. The steering shaft of claim 4, wherein at least two supporting bodies are arranged in a mirror-symmetrical manner relative to the longitudinal axis.

7. The steering shaft of claim 4, wherein at least two supporting bodies are pressed by the carrier part with respect to one another in a sprung manner against the inner shaft or the outer shaft.

8. The steering shaft of claim 1, wherein the securing element is a single-piece shaped sheet metal construction, the supporting body being configured as a bent portion.

9. The steering shaft of claim 1 wherein the supporting faces are supporting faces of the rolling body raceways.

10. The steering shaft of claim 1 wherein the securing element comprises a planar carrier part to which the supporting body is attached, wherein the planar carrier part is cross-shaped.

11. A steering shaft for a motor vehicle comprising:
    a hollow outer shaft;
    an inner shaft arranged coaxially in the outer shaft, wherein the inner shaft is configured to telescope relative to the outer shaft in a direction of a longitudinal axis of the steering shaft, wherein the inner shaft is connected in a torque-transmitting manner to the outer shaft via rolling bodies, wherein the rolling bodies are configured to roll in the direction of the longitudinal axis, wherein the rolling bodies bear in a positively locking manner in a circumferential direction with regard to a rotation about the longitudinal axis between rolling body raceways formed on the inner shaft and on the outer shaft; and
    a securing element including a supporting body arranged between supporting faces configured on the inner shaft and on the outer shaft and supported in a positively locking manner in the circumferential direction, wherein the securing element is attached to a longitudinal end of the outer shaft and protrudes longitudinally from the outer shaft,
    wherein the supporting body is spaced apart from the supporting faces of the inner shaft,
    wherein the securing element is comprised of a first securing element and a second securing element, wherein the first securing element is circumferentially spaced apart from the second securing element and is only indirectly connected to the second securing element, wherein the first and second securing elements are indirectly connected via the outer shaft.

* * * * *